United States Patent [19]

Brücher

[11] 4,432,252

[45] Feb. 21, 1984

[54] MANIPULATOR FOR CHARGING DEVICES

[76] Inventor: Eberhard Brücher, Lohweg 35, D-5900 Siegen 21, Fed. Rep. of Germany

[21] Appl. No.: 321,551

[22] Filed: Nov. 16, 1981

[30] Foreign Application Priority Data

Nov. 15, 1980 [DE] Fed. Rep. of Germany ....... 3043145

[51] Int. Cl.[3] .......................... G05G 1/04; B25J 15/02

[52] U.S. Cl. .................................. 74/469; 248/281.1; 414/738; 414/917

[58] Field of Search ............ 74/469; 248/280.1, 281.1; 414/4, 735, 738, 917

[56] References Cited

U.S. PATENT DOCUMENTS

| | | | |
|---|---|---|---|
| 619,445 | 2/1899 | Smith | 248/281.1 X |
| 991,101 | 5/1911 | Smith | 248/281.1 |
| 1,273,869 | 7/1918 | Joy | 414/917 |
| 2,856,815 | 10/1958 | Ross | 248/281.1 X |
| 4,102,284 | 7/1978 | Rohr | 414/917 |

FOREIGN PATENT DOCUMENTS

| | | |
|---|---|---|
| 2731792 | 2/1979 | Fed. Rep. of Germany . |
| 2840646 | 4/1980 | Fed. Rep. of Germany . |

*Primary Examiner*—Allan D. Herrmann
*Attorney, Agent, or Firm*—Young & Thompson

[57] ABSTRACT

A carrier that is adjustably interconnected with its base by means of parallelogram articulation including spherical bearings. The framework interconnecting the support with its base, includes two generally horizontal arms laterally spaced apart and interconnected at their forward ends with the support by spherical bearings and at their rear end to a hinge plate about spaced vertical pivots. The hinge plate is mounted for vertical swinging movement about a horizontal axis on and relative to the base. Another parallelogram linkage, this one arranged in a vertical plane, is provided by a fluid pressure cylinder disposed below the horizontal arms and serving as a tilting cylinder, which is connected by spherical bearings at its forward and rear ends to the carrier and to the base, respectively. A fluid pressure cylinder serving as a lifting cylinder pivotally interconnects the base and the lower part of the hinge plate. A swivel cylinder for swinging the parallelogram linkage in a horizontal direction, is disposed in the space between the horizontal arms and pivotally interconnects one of those arms with the hinge plate and is disposed at an acute angle to both of the horizontal arms. This swivel cylinder is of the double acting type so that when both chambers of the cylinder communicate with each other via the pressure medium tank and thus are not under pressure, the cylinder acts as a shock absorber to absorb lateral forces imposed from either direction.

3 Claims, 4 Drawing Figures

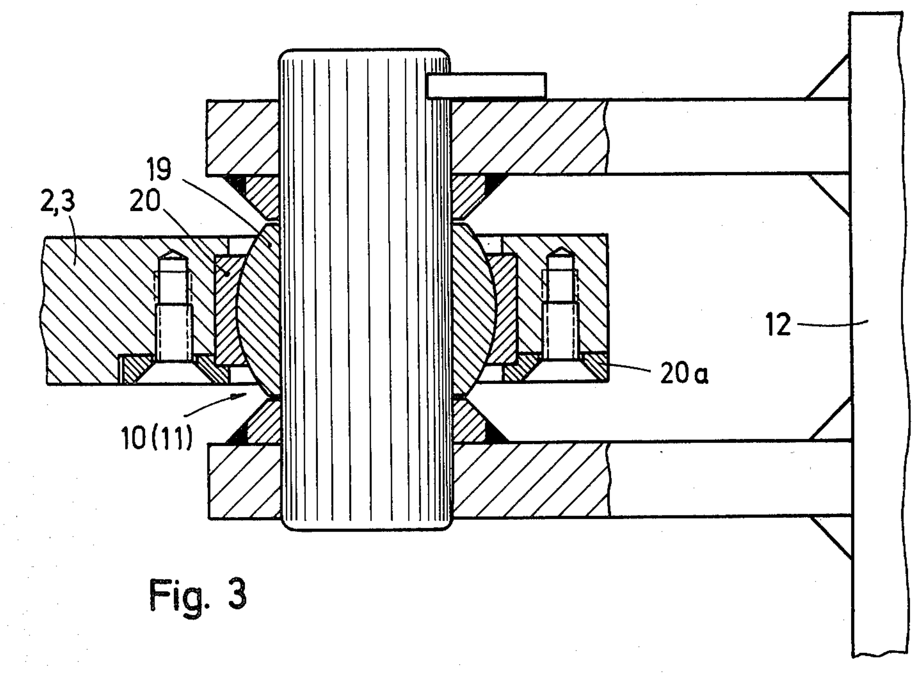
Fig. 3
Fig. 4
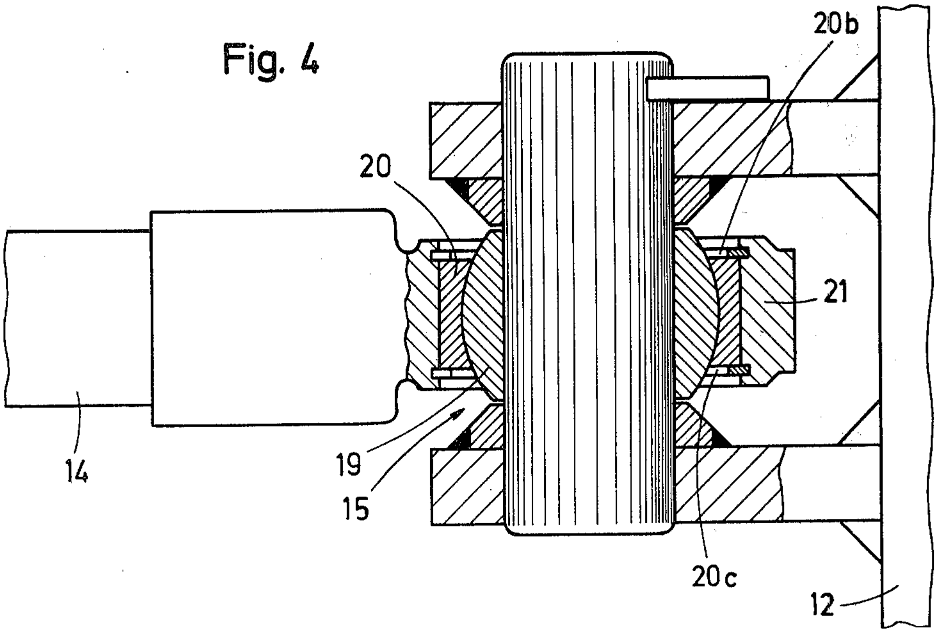

MANIPULATOR FOR CHARGING DEVICES

The present invention relates to deformable articulated parallelogram linkage supports, for example for manipulators for charging devices having a tool carrier. According to the present invention, the support can be adjusted by manipulation of the parallelogram linkage, in any desired direction upwardly, downwardly or laterally, and can also be tilted in either vertical direction.

DOS No. 2,840,646 (which is a German Unexamined Laid-Open Application) discloses a carriage for workpieces comprising a manipulator for charging devices having a parallelogram articulated frame for the execution of the aforementioned movements. In this prior art manipulator, separate hinged frames are provided for lifting, lowering, and tilting, on the one hand, and for lateral pivoting on the other hand. The result is a very costly construction which occupies a large volume of space. Moreover, only a limited number of different devices can be mounted on this known manipulator.

A charging device with a quick coupling for various implements, is disclosed in DOS No. 2,731,792. In this machine, the interchangeable tool carrier has a rotary drive mechanism and can be lifted, lowered, and tilted, but only in a vertical plane. Linear sideways parallel displacement of tool holders on axles is also known in manipulators of this type; but if external forces act on such manipulators, the tool carriers can become jammed on the axles and excessive wear can accordingly occur. Moreover, these known shifting devices are too rigid, with the result that when forces are applied laterally to such devices, the device cannot yield sufficiently to absorb these forces and to avoid damage from these forces. This disadvantage of inflexibility with respect to applied lateral forces is also present in the manipulator of DOS No. 2,840,646.

The present invention accordingly has for its principal object the provision of an articulated support which will overcome the above disadvantages of the known devices, and will be simple in construction, rugged, easy and inexpensive to maintain, compact, and suitable for use either in stationary installations or on appropriate conveyances.

These objects are achieved by the present invention, by providing a carrier that is adjustably interconnected with its base by means of parallelogram articulation including spherical bearings. The framework interconnecting the support with its base, includes two generally horizontal arms laterally spaced apart and interconnected at their forward ends with the support by means of spherical bearings and at their rear end to a hinge plate about spaced vertical pivots. The hinge plate is mounted for vertical swinging movement about a horizontal axis on and relative to the base. Another parallelogram linkage, this one arranged in a vertical plane, is provided by a fluid pressure cylinder disposed below the horizontal arms and serving as a tilting cylinder, which is connected by spherical bearings at its forward and rear ends to the carrier and to the base, respectively. A plurality of such lower cylinders can also be provided.

Preferably, a fluid pressure cylinder serving as a lifting cylinder pivotally interconnects the base and the lower part of the hinge plate.

A swivel cylinder for swinging the parallelogram linkage in a horizontal direction, is disposed in the space between the horizontal arms and pivotally interconnects one of those arms with the hinge plate and is disposed at an acute angle to both of the horizontal arms. This swivel cylinder is of the double acting type so that when both chambers of the cylinder communicate with each other via the pressure medium tank and thus are not under pressure, the cylinder acts as a shock absorber to absorb lateral forces imposed from either direction.

These and other objects, features and advantages of the present invention will become apparent from a consideration of the following description, taken in connection with the accompanying drawings, in which:

FIG. 3 is an enlarged fragmentary view, with parts broken away, taken on the line III—III of FIG. 1; and FIG. 4 is a view similar to FIG. 3 but taken on the line IV—IV of FIG. 1.

Figure 1:
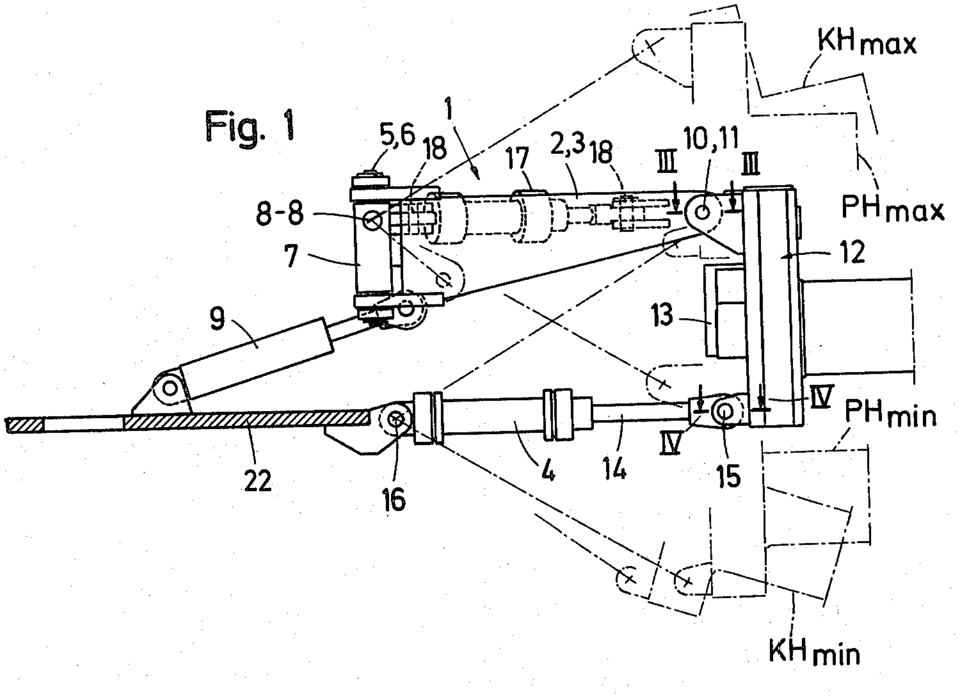
FIG. 1 is a side elevational view of a support according to the present invention, with its neutral position shown in full line and its extreme positions shown in phantom line.
Figure 2:
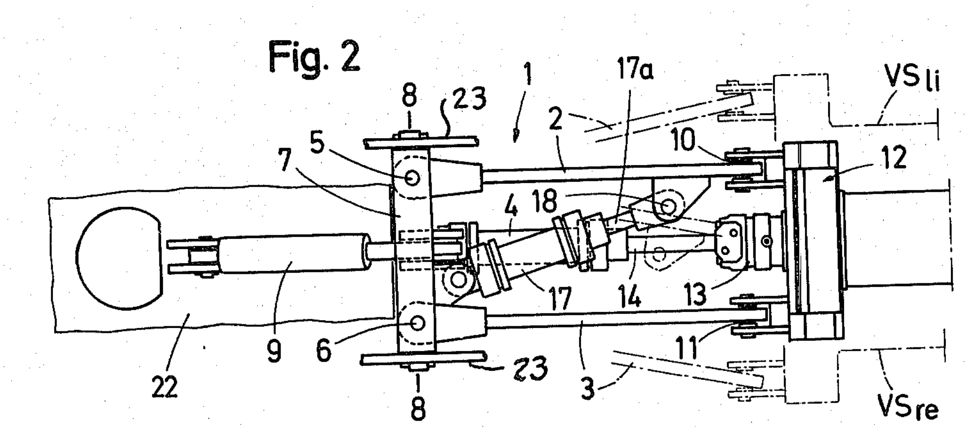
FIG. 2 is a top plan view of the support, with the neutral position shown in full line and two laterally displaced positions shown in phantom line.

Referring now to the drawings in greater detail, and first to FIGS. 1 and 2 thereof, there is shown a support according to the present invention adapted to be mounted on a fixed machine frame or on a suitable conveyance, comprising a parallelogram articulation frame 1 comprised by two upper longitudinal horizontal frame members on arms 2, 3. Spaced below these, in general parallelism thereto, is a tilting cylinder 4, so that the parallelogram articulation frame 1 is in effect three dimensional, comprised by a horizontal parallelogram linkage as shown in plan in FIG. 2, and a vertical parallelogram linkage as shown in elevation in FIG. 1. Ordinarily, one tilting cylinder 4 suffices; but it is also possible to provide several tilting cylinders if necessary.

The upper arms 2, 3 are pivotally mounted at 5, 6 for horizontal swinging movement about spaced vertical axes, on a hinge plate 7, which in turn is pivotal about a horizontal axis 8 on and between relatively fixed base plates 23. A lifting cylinder 9 is articulated to a lower portion of hinge plate 7 and to a base plate 22. The forward ends of arms 2, 3 are interconnected by spherical bearings 10, 11 to a carrier which in the illustrated embodiment is a tool carrier 12 adapted to carry grippers, forks, supporting rods for charging troughs, or other charging or gripping implements. Tool carrier 12 can have a rotary drive mechanism 13, for example for rotating a load carrier in the form of tongs or a bucket.

Tilting cylinder 4 has a piston rod 14 universally pivotally connected at its forward end to carrier 12 by means of a spherical bearing 15 disposed a substantial distance below bearings 10, 11. At its rear end, cylinder 4 is connected to base plate 22 by a spherical bearing 16.

In the free space between arms 2 and 3, a swivel cylinder 17 is disposed for laterally swinging the carrier 12. Piston rod 17*a* of cylinder 17 is pivotally interconnected with a forward portion of arm 2 for relative horizontal swinging movement about a vertical axis at 18; while the rear end of cylinder 17 is pivotally interconnected for horizontal swinging movement on and relative to hinge plate 7 about another vertical axis at 18.

The spherical bearings 10, 11 are shown in greater detail in FIG. 3 and can be identical to each other. They include low maintenance synthetic resin bearing shells 19, 20, as does also the spherical bearing 15 shown in FIG. 4. In FIG. 3, the outer shell 20 is secured in the forward end of arms 2, 3 by holding plates 20*a;* while in FIG. 4, the outer bearing shell 20 is held by means of spring rings 20*b,* 20*c* in the forward end of piston rod 14 of tilting cylinder 4.

In FIGS. 1 and 2, the neutral central or normal position of the structure is shown in full line and the outermost lifting, tilting and shifting positions are shown in phantom line. In this connection, the legends applied to FIGS. 1 and 2 have the following meanings:

$PH_{max}$=highest parallel lifting position,
$PH_{min}$=lowest parallel lifting position,
$KH_{max}$=highest tilted lifting position,
$KH_{min}$=lowest tilted lifting position,
$VS_{li}$=shifting position, left,
$VS_{re}$=shifting position, right.

If the tilting cylinder 4 is hydraulically blocked in its central position, shown in FIG. 1, and the lifting cylinder 9 is actuated to swing the structure up or down, then the cylinder 4 and its piston rod 14 will remain parallel to the arms 2, 3, with the result that the structure will articulate in the manner of a parallelogram linkage and the same vertical orientation of the carrier 12 will be preserved in all vertically shifted positions of the structure. In other words, carrier 12 will move parallel to itself. Correspondingly, if cylinder 4 is extended or retracted, then the carrier 12 will be tilted and, upon operation of cylinder 9, will move parallel to itself in that tilted orientation.

Upon actuation of swivel cylinder 17, the upper arms 2, 3 of the parallelogram linkage shown in FIG. 2 will move parallel to each other, so that carrier 12 will swing horizontally in parallelism to itself, that is, maintaining its same orientation. Of course, this wide range of movements of carrier 12 relative to the base 22, 23 is made possible by the spherical bearings 10, 11, 15 and 16. These spherical bearings thus provide an extremely compact and simple, but rugged mechanism.

As previously indicated, the impact of laterally imposed shocks, for example as a result of forging operations on a workpiece carried by support 12, can be absorbed by placing the swivel cylinder 17 with both its chambers in communication with its reservoir and hence not under pressure, so that the piston rod of cylinder 17 can float and thus absorb laterally imposed shocks.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An adjustable support with articulated parallelogram linkage, comprising a carrier, a base, parallelogram linkage interconnecting the carrier and the base, and spherical bearings interconnecting the parallelogram linkage and the carrier, the parallelogram linkage comprising two arms disposed in the same horizontal plane and interconnected at their forward ends by spherical bearings to an upper portion of said carrier, the rear ends of the arms being pivotally interconnected for horizontal swinging movement about spaced vertical axes on a hinge plate, means mounting the hinge plate for vertical swinging movement about a horizontal axis on the base, and a fluid pressure cylinder disposed below and parallel to the arms and interconnected at its forward end by a spherical bearing to a lower portion of the carrier and at its rear end by a spherical bearing to the base.

2. A support as claimed in claim 1, and a fluid pressure cylinder pivotally interconnected about a horizontal axis to a lower portion of said hinge plate at its forward end and pivotally interconnected to the base about a horizontal axis at its rear end.

3. A support as claimed in claim 1, and a swivelling cylinder pivotally interconnected about a vertical axis at its forward end to one of said arms and pivotally interconnected about a vertical axis at its rear end to said hinge plate and disposed at an acute angle to said arms.

* * * * *